3,014,056
CARBON FUNCTIONAL ORGANO-SILOXANE FLUOROESTERS
Paul M. Kerschner, 53 Kimo Blvd., Mercerville, N.J., and Bertrand Greenwald, 103 Bryant Road, Woodcrest, Haddonfield, N.J.
No Drawing. Filed May 11, 1959, Ser. No. 812,145
12 Claims. (Cl. 260—448.2)

This invention relates to a new series of dibasic acid esters useful as synthetic lubricants and hydraulic fluids. More particularly, this invention relates to carbon functional organo-siloxane dibasic acid fluoroesters.

The new fluoroesters of the present invention may be generally characterized as those prepared by reacting one mol of a carbon functional organo-siloxane dibasic acid with two mols of a partially or completely fluorinated alcohol. By a carbon functional organo-siloxane acid we mean one in which the carboxyl group is attached directly to a carbon atom, as distinguished from a carboxyl group attached to a silicon atom through an oxygen atom. The latter bonding is a so-called silicate bonding and is prone to hydrolysis in the presence of water. When used for lubricating purposes in the presence of water, compounds including such a linkage are unstable and, therefore, unsatisfactory for lubricating purposes. It is, therefore, more desirable to avoid such linkage and utilize a carbon functional organo-siloxane acid.

The new fluorodiesters of the present invention possess properties and characteristics making them particularly suitable for use as lubricants or hydraulic fluids. The presence of fluorine in the molecule substantially improves the wear characteristics of these compounds, making them superior to existing silicon containing synthetic lubricants. In addition to their improved wear properties, the new compounds of the present invention are characterized by having a high degree of stability to oxidation, high viscosity indexes, high specific gravity, comparatively high flash and fire points and low pour points. Such properties make the compounds of the present invention particularly suitable for lubricating purposes, and also as base stock for synthetic grease compositions.

The new compounds of the present invention are characterized by the following general structure:

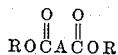

in which A represents the divalent group

wherein R' represents an alkyl radical having from 1 to 8 carbon atoms, aryl, alkyl aryl, aralkyl, or mixtures of these, $n$ has a value of from 2 to 7, $m$ has a value of from 1 to 6; R represents the monovalent group $$CH_xF_{3-x}(CH_yF_{2-y})_wCH_2-$$

wherein $x$ has a value of from 0 to 2, $y$ has a value of from 0 to 2, and $w$ has a value of from 0 to 10.

Compounds having the foregoing general structure, when utilized as synthetic lubricants, will have a molecular weight in the range from about 370 to about 2400, a maximum kinematic viscosity of about 230 cs. at 100° F. and a pour point maximum of about −10° F. To insure the desired wear characteristics, the silicon to fluorine weight ratio should be in the range of from 0.5:1 to 1.5:1 and preferably from 0.5:1 to 1:1. This weight ratio of silicon to fluorine must be maintained if proper lubricating characteristics are to be obtained, since a high silicon content provides desired V.I. but poor lubricity. If the fluorine content with respect to silicon is increased beyond the stated ratio, a poor V.I. lubricant will be obtained. Compounds prepared according to the general formula and having the characteristics set forth will generally satisfy the synthetic lubricant specification Mil. Spec. 7808B and the Shell four ball test (Lubrication Engineers Manual).

In the foregoing general formula the divalent group represented by A is the residue of the carbon functional organo-siloxane dibasic acid. Such acids are known to those skilled in the art, and may be prepared by subjecting a chlorinated alkyl disiloxane to a malonic ester synthesis. The product of the synthesis is hydrolyzed and decarboxylated. A more complete description of these acids and the method of preparing them may be found in JACS, 78, 2010 (1956).

As will be more clearly shown in the examples which follow, the siloxane grouping appearing in the brackets in the divalent acid residue radical may be increased by treating a polysiloxane ester with concentrated sulfuric acid in the presence of octamethylcyclotetrasiloxane. This method of expanding the siloxane center of the dibasic acid is more specifically described in JACS 75, 6337 (1953).

The monovalent group represented in the generic structure of the new diesters and characterized as $$CH_xF_{3-x}(CH_yF_{2-y})_wCH_2-$$

wherein $x$ has a value of from 0 to 3, $y$ has a value of from 0 to 2, and $w$ has a value of from 0 to 10, is obtained from the particular fluorinated alcohol utilized. For the purposes of the present invention any fluorinated alcohol having from 2 to about 12 carbon atoms can be utilized; saturated fluorinated alcohols having from 2 to about 10 carbon atoms are preferred. Typical of the fluorinated alcohols suitable for this purpose are the following:

2 fluoroethanol,
1,1 dihydroperfluoroethanol,
1,1 dihydroperfluoropropanol,
1,1,3 trihydroperfluoropropanol,
1,1,2,2 tetrahydroperfluoropropanol,
1,1 dihydroperfluorobutanol,
1,1,4 trihydroperfluorobutanol,
1,1,2,2,3,3 hexahydroperfluorobutanol,
1,1 dihydroperfluoropentanol,
1,1,5 trihydroperfluoropentanol,
1,1,2,2,3,3,4,4 octahydroperfluoropentanol,
1,1 dihydroperfluorohexanol,
1,1,6 trihydroperfluorohexanol,
1,1 dihydroperfluoroheptanol,
1,1,7 trihydroperfluoroheptanol,
1,1 dihydroperfluorooctanol,
1,1,3 trihydroperfluorooctanol,
1,1,8 trihydroperfluorooctanol,
1,1 dihydroperfluorononanol,
1,1,9 trihydroperfluorononanol,
1,1 dihydroperfluorodecanol,
1,1,10 trihydroperfluorodecanol,
1,1 dihydroperfluoroundecanol,
1,1,11 trihydroperfluoroundecanol,
1,1 dihydroperfluorododecanol and
1,1,12 trihydroperfluorododecanol Other fluorinated alcohols, including secondary and tertiary alcohols, having molecular weights within the range of the foregoing fluorinated alcohols, may be used.

In carrying out the esterification reaction by which these new fluoroesters are prepared, an acid catalyst will normally be utilized. Suitable acids for this purpose are sulfuric acid, phosphoric acid, p-toluene sulfonic acid, hydrogen chloride, thionyl chloride, acetyl chloride, boron trifluoride and trifluoroacetic acid.

The examples which follow illustrate the method by which the new compounds of this invention may be prepared. It is to be understood that these examples are merely illustrative and are not to be construed as limiting the invention in any way.

EXAMPLE 1

17.4 grams (0.06 mol) of 4,4,6,6 tetramethyl 4,6 disila 5 oxa nonanedioic acid, 16.0 grams (0.25 mol 100% excess) of 2-fluoroethanol, 0.05 gram p-toluene sulfonic acid, and 150 cc. of benzene are introduced into a 500 ml. three-neck, round-bottom flask provided with a mechanical stirrer, a reflux condenser fitted with a water trap, and a thermometer. The reactants are mixed and refluxed at a temperature of about 75° C. for a period of about 8 hours so as to remove from the reaction mixture as benzene-water-alcohol azeotrope, the water of esterification. The reaction is continued until the acid number of the mixture is reduced to a value of less than two. Unreacted alcohol and benzene solvent are removed from the reaction mixture by distillation at atmospheric pressure. The crude product remaining after removal of the unreacted alcohol and benzene is then washed with water, washed with 10% $Na_2CO_3$, and finally washed with water to remove any unreacted acid and catalyst. The desired product is then recovered by distillation at reduced pressure of about 0.5 to 1.0 mm. Hg. An analysis of the di (2 fluoroethyl) 4,4,6,6 tetramethyl 4,6 disila 5 oxa nonanedioate obtained provided the following:

Refr. index _____ 1.4343
Density 25/25 _____ 1.084
Vis.:
    100° F. cs _____ 7.15
    210° F. cs _____ 1.94
Pour point, ° F _____ −65

|  | Theoretical | Found |
|---|---|---|
| Mol. Wt | 370 | 369 |
| Percent Silicon | 15.1 | 13.4 |

EXAMPLE 2

56.0 grams (0.20 mol) of 4,4,6,6 tetramethyl 4,6 disila 5 oxa nonanedioic acid, 120.0 grams (0.60 mol 50% excess) of 1,1 dihydroperfluorobutanol, 3.0 grams of p-toluene sulfonic acid, and 400 ml. of benzene are mixed in a 1000 ml., three-neck, round-bottom flask provided with a mechanical stirrer, a reflux condenser and a thermometer. The reaction mixer is refluxed at a temperature of about 75° C. for approximately 8 hours. After 0.4 mol of water has been recovered, indicating completion of the esterification reaction, reflux is discontinued, and unreacted alcohol and benzene are removed from the reaction zone by distillation at atmospheric pressure. The crude product remaining is washed with water, washed with 10% $Na_2CO_3$, and again washed with water to remove any reacted acid and catalyst. The product is recovered by distilling at a reduced pressure of about 3 mm. Hg. The product isolated is di (heptafluorobutyl) - 4,4,6,6 - tetramethyl - 4,6 - disila - 5 - oxanonanedioate. In Table I which follows the properties and characteristics of this compound are set forth under Example 2.

EXAMPLE 3

In a similar manner following the method set forth in Example 2 above, di 1,1 dihydroperfluoropropyl-4,4,6,6,8,8 - hexamethyl - 4,6,8 - trisila - 5,7, - dioxaundecanedioate is prepared by mixing together at a temperature of about 110° C. for a period of 8 hours, 35.2 grams (0.10 mol) of 4,4,6,6,8,8 hexamethyl 4,6,8 trisila 5, 7 dioxaundecanedioic acid, 45.0 grams (0.30 mol 50% excess) of 1,1 dihydroperfluoropropanol, 0.7 gram of p-toluene sulfonic acid, and 200 ml. of toluene. After esterification has been completed, as indicated by the recovery of 0.2 mol of water, the toluene solvent and unreacted alcohol are removed by distillation at atmospheric pressure, leaving a crude product which is thereafter washed with water, 10% $Na_2CO_3$, and finally washed with water to remove any unreacted acid and catalyst. Distillation at reduced pressure provides the desired reaction product.

EXAMPLE 4

By following the method set forth in Examples 1 and 2, di 1,1 dihydroperfluoropentyl-7,7,9,9,11,11,13,13,15,15,17,17,19,19 - tetradecamethyl - 7,9,11,13,15,17,19- heptasila - 8,10,12,14,16,18 - hexaoxapentacosanedioate is prepared by reacting 73.2 grams (.10 mol) of 7,7,9,9,11,11,13,13,15,15,17,17,19,19 - tetradecamethyl - 7,9,11,13,15,17,19 - heptasila, - 8,10,12,14,16,18 - hexaoxapentacosanedioic acid with 75 grams (.30 mol 50% excess) of 1,1 dihydroperfluoropentanol alcohol in the presence of 0.20 gram of p-toluene sulfonic acid catalyst in a round bottom flask provided with a mechanical stirrer and a reflux condenser having fitted thereto a water trap and a thermometer. To the reactant mixture, 500 cc. of toluene is added, and the reaction mixture refluxed at a temperature of 110° C. for a period of about 8 hours. During the reflux period, water of esterification is removed and trapped in the water trap as a toluene water azeotrope. Refluxing is continued until the acid number of the reactant mixture is reduced to a value of less than 2. After esterification has been substantially completed, based on the foregoing acid number test, unreacted alcohol and toluene solvent are distilled from the reaction mixture at atmospheric pressure. The crude product remaining after removal of unreacted alcohol and toluene is washed with water, washed with 10% $Na_2CO_3$, and again washed with water to remove any unreacted acid and catalyst from the crude product. Distillation of the crude product at a reduced pressure of about 1.0 mm. Hg. produces the desired product.

EXAMPLE 5

To prepare the compound di 1,1, dihydroperfluoropentyl-4,4,6,6 tetramethyl 4,6-disila, 5-oxanonanedioate, 16.7 grams (0.06 mol) of 4,4,6,6 tetramethyl-4,6-disila, 5-oxanonanedioic acid is mixed with 30.0 grams (0.12 mol) of 1,1 dihydroperfluoropentanol alcohol in the presence of 0.20 gram of p-toluene sulfonic acid. To the mixture of the reactants, 500 cc. of toluene is added, with the acid being esterified by refluxing the reactant mixture at the reflux temperature for a period of about 8 hours. Carrying out the reflux of the reactant mixture at this temperature effects removal of water from the reaction zone as a toluene water azeotrope. When the reactant mixture has an acid number value of less than 2, the esterification reaction is sufficiently complete so that reflux can be discontinued and the unreacted alcohol and toluene solvent are removed from the reaction mixture by atmospheric distillation. After removal of unreacted alcohol and toluene, the crude product is water washed, treated with 10% sodium carbonate, and again water washed to remove any unreacted acid and catalyst remaining in the crude product. Recovery of the final product is accomplished by distillation at a reduced pressure of between 0.5 and 1.0 mm. Hg.

EXAMPLE 6

73.2 grams (0.10 mol) of 7,7,9,9,11,11,13,13,15,15,17,17,19,19 - tetradecamethyl - 7,9,11,13,15,17,19-heptasila-8,10,12,14,16,18-hexaoxapentacosanedioic acid are reacted with 19.2 grams (0.30 mol 50% excess) of 2-fluoroethanol in the presence of 0.2 gram of p-toluene sulfonic acid. 300 cc. of benzene is added to the reaction mixture to permit removal of a benzene water alcohol azeotrope during the esterification reaction. The azeotrope is recovered in a water trap during reflux of the reaction mixture. Reflux is continued for a period of time sufficient to reduce the acid number of the reactant mixture to a value of less than 2. At the reflux temperature of the benzene water alcohol azeotrope, this requires about 8 hours. After the esterification reaction is completed, unreacted alcohol and benzene solvent are removed from the reaction zone by distillation at atmospheric pressure. The crude product remaining is then washed with water, treated with 10% sodium carbonate solution, and again washed with water to insure removal of unreacted acid and acid catalyst from the reaction product. Final product recovery is accomplished by distilling the crude product at a reduced pressure of about 1.0 mm. Hg. A final product, di (2-fluoroethyl)-7,7,9,9,11,11,13,13,15,15,17, 17,19,19 - tetradecamethyl-7,9,11,13,15,17,19-heptasila-8, 10,12,14,16,18-hexaoxapentacosanedioate, is obtained.

EXAMPLE 7

16.7 grams (0.06 mol) of 4,4,6,6-tetramethyl-4,6-disila-5-oxanonane dioic acid are reacted with 14.8 grams (0.18 mol 50% excess) of 1,1,2-trihydroperfluoroethanol in the presence of 0.2 gram of p-toluene sulfonic acid. 250 cc. of benzene is added to the reaction mixture to permit removal of benzene water alcohol azeotrope during the esterification reaction. The azeotrope is recovered in a water trap during reflux of the reaction mixture. Reflux is continued for a period of time sufficient to reduce the acid number of the reactant mixture to a value of less than 2. At the reflux temperature of the benzene water alcohol azeotrope, this requires about 8 hours. After the esterification reaction is comp'eted, unreacted alcohol and benzene solvent are removed from the reaction zone by distillation at atmospheric pressure. The crude product remaining is then washed with water, treated with 10% sodium carbonate solution, and again washed with water to insure removal of unreacted acid and acid catalyst from the reaction product. Final product recovery is accomplished by distilling the crude product at a reduced pressure of about 1.0 mm. Hg. A final product, di 1,1,2 trihydroperfluoroethyl-4,4,6,6-tetramethyl-4,6-disila-5-oxanonanedioate, is obtained.

EXAMPLE 8

139 grams (0.5 mol) of 4,4,6,6-tetramethyl-4,6-disila-5-oxanonanedioic acid is reacted with 292 grams (2.21 mols) of 1,1,3 trihydroperfluoropropyl alcohol in the presence of 1 gram of concentrated sulfuric acid. 300 cc. of benzene is added to the reaction mixture and heat applied under reflux conditions to initiate an esterification reaction. A benzene water alcohol azeotrope is recovered during reflux of the reaction mixture. Reflux is continued until an acid number of less than 2 is obtained for the reactant mixture. After the esterification reaction is complete, unreacted alcohol and benzene solvent are removed from the reaction zone by distillation at atmospheric pressure. The crude product is then treated according to the manner described above. The final product recovered, di (1,1,3 trihydroperfluoropropyl)-4,4,6,6-tetramethyl-4,6-disila-5-oxanonanedioate, is a colorless liquid which boils at 51° C. (15–18 microns Hg).

EXAMPLE 9

In a manner similar to that described in Example 8 above, 56 grams (0.2 mol) of 4,4,6,6-tetramethyl-4,6-disila-5-oxanonanedioic acid is reacted with 200 grams (0.6 mol) of 1,1,7 trihydroperfluoroheptyl alcohol in the presence of 1 gram of concentrated sulfuric acid and 300 cc. of toluene. After completion of the esterification reaction, a colorless liquid, di(1,1,7 trihydroperfluoroheptyl) - 4,4,6,6 - tetramethyl-4,6-disila-5-oxanonanedioate, boiling at 84° C. (16 microns Hg) is obtained. See Table I for its properties.

As has been described, the siloxane nucleus of the diacid represented in the general structure by the bracketed portion may vary in size, as indicated by $m$, from a value of 1 to 6. Variations in this nucleus are accomplished by utilizing an acid having the desired number of siloxane groups in the structure, or by treating the final carbon functional organo-siloxane dibasic acid fluoroester with concentrated sulfuric acid in the presence of octamethylcyclotetrasiloxane. The example which follows is a demonstration of the latter method.

EXAMPLE 10

To 506 grams (1 mol) of the product of Example 8, namely, di(1,1,3 trihydroperfluoropropyl)-4,4,6,6-tetramethyl-4,6-disila-5-oxanonanedioate, is reacted with 76 grams (0.258 mol) of octamethylcyclotetrasiloxane in the presence of 9.75 cc. of concentrated sulfuric acid. The reaction mixture is stirred at room temperature for 15 hours. After this period of time, 35 cc. of water is added and the reaction mixture stirred an additional 15 minutes. An aqueous layer is then drawn off and the ester product washed with three 75 ml. portions of 5% $NaHCO_3$ followed by four 150 ml. washings with water. The washed material is dried and distilled at reduced pressure to recover unreacted starting material. During distillation, four major cuts were taken corresponding to the cuts 1, 2, 3 and 4, as shown in Table I which follows:

*Table I*

| Product | Ex. 10 | Ex. 10, Cut 1 | Ex. 10, Cut 2 | Ex. 10, Cut 3 | Ex. 10, Cut 4 | Ex. 9 | Ex. 2 |
| --- | --- | --- | --- | --- | --- | --- | --- |
| Acid | 1a | 1b | 1c | 1d | 1d+ | 1a | 1a |
| Alcohol | 5 | 5 | 5 | 5 | 5 | 7 | 9 |
| $m$ | 1+ | 2 | 3 | 4 | 4+ | 1 | 1 |
| Boiling Range, °C | 55–60 | 60–70 | 70–80 | 70–100 | 100 | 84 | 50–60 |
| Pressure, $\mu$ Hg | 13 | 13 | 13 | 10–13 | 13 | 18 | 50–90 |
| R.I., 28.5° C | 1.3990 | 1.3998 | 1.4001 | 1.4014 | 1.4040 | | |
| Sap. No | 208 | 194 | 174 | 152 | 151 | 121 | 182 |
| Sap. No. (Theo.) | 222 | 193 | 172 | 154 | | 124 | 180 |
| Percent Si | 12.8 | 15.3 | 17.1 | 19.7 | 20.9 | 6.1 | 9.3 |
| Percent Si (Theo.) | 11.1 | 14.5 | 17.2 | 19.2 | | 6.2 | 9.1 |
| Percent F | 27.7 | 25.3 | 22.9 | 20.4 | 19.4 | 51.2 | 40.1 |
| Percent F (Theo.) | 30.0 | 26.1 | 23.2 | 20.8 | | 51.5 | 39.8 |
| Si=F | 0.46:1 | 0.57:1 | 0.77:1 | 0.90:1 | 1.1:1 | 0.12:1 | 0.23:1 |
| Vis. @ 100° F., cs | 8.72 | 9.68 | 9.78 | 10.38 | 11.57 | 17.02 | 5.59 |
| Vis. @ 210° F., cs | 2.31 | 2.58 | 2.77 | 3.04 | 3.34 | 3.31 | 1.62 |
| V.I. | 81 | 108 | 146 | 169 | 180 | 52 | |
| Pour Pt., °F | 75 | 65 | 65 | 65 | 65 | 65 | 60 |
| Flash Pt., °F | | | | | | 445 | |
| Fire Pt., °F | | | | | | 475 | |

1a=4,4,6,6-tetramethyl-4,6-disila-5-oxanonanedioic acid.
1b=4,4,6,6,8,8-hexamethyl-4,6,8-trisila-5,7-dioxaundecanedioic acid.
1c=4,4,6,6,8,8,10,10-octamethyl-4,6,8,10-tetrasila-5,7,9-trioxatridecanedioic acid.
1d=4,4,6,6,8,8,10,10,12,12-decamethyl-4,6,8,10,12-pentasila-5,7,9,11-tetraoxapentadecanedioic acid.
7=1,1,7 Trihydroperfluoroheptanol.
5=1,1,3 Trihydroperfluoropropanol.
9=1,1 dihydroperfluorobutanol.

EXAMPLE 11

To 278 grams (0.1 mol) of 4,4,6,6-tetramethyl-4,6-disila-5-oxanonanedioic acid 1296 grams (0.3 mol) of 1,1,9 trihydroperfluorononanol is added together with 300 cc. of toluene and 1 gram of concentrated sulfuric acid. After esterification is complete and the product treated according to the method previously described, a colorless liquid is obtained.

EXAMPLE 12

To 500 grams (0.1 mol) of 4,4,6,6,8,8,10,10,12,12-decamethyl - 4,6,8,10,12 - pentasila - 5,7,9,11 tetraoxapentadecanedioic acid, 1650 grams (0.3 mol) of 1,1 dihydroperfluoroundecanol is added, together with approximately 300 cc. of toluene and 1 gram of concentrated sulfuric acid. After esterification is completed and the product recovered according to the method previously described, a substantially colorless di(1,1 dihydroperfluoroundecyl) - 4,4,6,6,8,8,10,10,12,12-decamethyl - 4,6,8,10,12 - pentasila - 5,7,9,11 - tetraoxapentadecanedioate product is obtained.

EXAMPLE 13

To 426 grams (0.1 mol) of 4,4,6,6,8,8,10,10-octamethyl - 4,6,8,10 - tetrasila - 5,7,9 - trioxatridecanedioic acid, 1296 grams (0.3 mol) of 1,1,9 trihydroperfluorononanol is added, together with 300 cc. of toluene and 1 gram of sulfuric acid. After esterification is completed and the product recovered according to the method previously described, di-1,1,9 trihydroperfluorononyl-4,4,6,6,8,8,10,10 - octamethyl - 4,6,8,10 - tetrasila - 5,7,9 - tridecanedioate will be obtained.

EXAMPLE 14

56 grams of the acid 4,4,6,6-tetramethyl-4,6-disila-5-oxanonanedioic acid and 106 grams (50% excess) of thionyl chloride were placed in a 1 liter 3 neck round bottom flask fitted with a mechanical stirrer, condenser and thermometer. The mixture was stirred for 6 hours at a temperature of 40° to 45° C. Excess thionyl chloride was then removed under vacuum.

To the residue 52 grams of diphenyl dichlorosilane was added and the mixture slowly poured into an agitated mixture of 500 grams of crushed ice and 1 liter of toluene. Agitation was continued until the ice melted. The mixture was made basic by the addition of alkali and the organic phase removed. The solvent was removed, leaving polymeric diphenyl siloxane residue. The alkali water phase was acidified and the acid mixture extracted three times with ether. The combined extracts were dried with anhydrous $MgSO_4$. Ether was removed by distillation. The product acid residue was then identified by its silicon content, neutralization number and infrared analysis:

|  | Found | Theoretical |
|---|---|---|
| Percent Silicon | 16.8 | 16.6 |
| Neut. Number | 173 | 167 |

Infrared analysis indicated the presence of the following bondings, silicon to phenyl, silicon to methyl, silicon to oxygen to silicon, carbon to hydrogen and carboxyl acid.

An ester was then prepared with the foregoing acid and 1,1,5 trihydroperfluoropentol in the manner previously described. The product di(1,1,5 trihydroperfluoropentyl) - 4,4,10,10 - tetramethyl - 6,6,8,8, - tetraphenyl-4,6,8,10-tetrasila-4,7,9-trioxatridecanedioate had the following properties:

|  | Theoretical | Found |
|---|---|---|
| Saponification No | 113 | 103 |
| Percent Si | 9.41 | 10.3 |
| Percent F | 28.2 | 27.5 |

| | |
|---|---|
| Vis. @ 100° F. cs | 63.95 |
| Vis. @ 210° F. cs | 8.39 |
| V.I. | 109 |
| Pour point, ° F | −30 |

As has been previously indicated, the new compounds of the present invention are particularly suitable as synthetic lubricants. As such, they may be employed individually or they may be blended to form mixed lubricants, depending on the desired characteristics of the finished product. Their comparatively high viscosity indexes and high flash point make the compounds of the present invention particularly suitable as synthetic lubricants. These new compounds can be further improved or modified by incorporating therewith various additives such as anti-oxidants, pour point depressants, thickeners, soaps, dyes, etc., according to the particular use for which the composition is contemplated.

In the table which follows representative compounds of the present invention are compared with the single fluoroesters of substantially similar structure. It will be noted that the compounds of the present invention have higher flash and fire points and lower pour points for samples of similar fluorine content and viscosities. The simple fluoroesters identified as NRL 1-4 (Naval Reserve Laboratory Report 4493) show very poor viscosity-temperature characteristics as compared to the new compounds of the present invention.

*Table II*

COMPARISON OF CARBON-FUNCTIONAL ORGANOSILICON FLUOROESTERS WITH SIMPLE FLUOROESTER

| Sample No. | Acid | Alcohol | Atoms in Principal Chain | Percent F. | Viscosity, cs., 100° F. | 210° F. | V.I. | Pour Pt., ° F. |
|---|---|---|---|---|---|---|---|---|
| Ex. 10, Cut 3 | 1d | 5 | 23 | 20.8 | 10.38 | 3.04 | 169 | −65 |
| Ex. 10, Cut 4 | 1d+ | 5 | | 19.4 | 11.57 | 3.34 | 180 | −65 |
| Ex. 10, Cut 2 | 1c | 5 | 21 | 22.9 | 9.78 | 2.77 | 146 | −65 |
| Ex. 9 | 1a | 7 | 25 | 51.5 | 17.02 | 3.31 | 52 | −65 |
| NRL1 | 3 | 9 | 20 | 47.0 | 6.63 | 1.84 | 112 | 36 |
| NRL2 | 2 | 6 | 18 | 52.9 | 14.7 | 2.86 | 71 | 25 |
| NRL3 | 3 | 6 | 22 | 48.2 | 18.6 | 3.59 | 101 | 16 |
| NRL4 | 4 | 7 | 21 | 58.9 | 26.4 | 3.70 | 19 | −60 |

Acid 3=sebacic acid.
Acid 2=adipic acid.
Acid 4=methylglutaric acid.
Alcohol 6=1,1,5 trihydroperfluoropentanol.
Other alcohols=See Table I.

As will be apparent from Table II the new compounds of the present invention have improved V.I. and pour point characteristics over the compounds reported by the Naval Research Laboratory Report 4493. When used as lubricants, the viscosity indexes characteristic is, of course, most important. The pour characteristics which are considerably lower in the compounds of the present invention are important when these compounds are used either as lubricants or as hydraulic fluids.

The lubricating properties of the compounds of the present invention are demonstrated in the data which follows in Tables III and IV. The data in these tables was obtained on the standard Shell four ball testing apparatus. This test apparatus includes three rigidly held half inch metal balls (Type 52–100 steel balls) submerged in a lubricant in a metal cup. A fourth ball of the same size is pressed into contact with the three fixed balls by an adjustable loading arm and allowed to rub for a fixed period of time. The contact points on the three stationary balls grow to circular scars as wear progresses. The average diameter of these scars in millimeters after the fixed period of operation at a particular speed and load is taken as the measure of wear. The temperature at which the test is conducted may be varied from room temperature to temperature as high as 170° C. The data set forth in Table III was obtained with steel bearings (52-100) at a speed of 600 r.p.m. at 70° C. in a two-hour period. The data in Table IV was obtained with the same steel bearings at a speed of 1800 r.m.p. at 70° C. in three seconds with five drops of fluid.

*Table III*

COMPARISON OF WEAR PROPERTIES OF CARBON-FUNCTIONAL ORGANOSILICON FLUOROESTERS WITH PETROLEUM OIL AND COMMERCIAL "A" SILICONE FLUID

[Scar Diameter in mm.]

| Sample No. | Ex. 9 | Ex. 10, Cut 1 | Ex. 10, Cut 3 | Ex. 12 | 100 Neut. Min. Oil | Comm. "A" |
|---|---|---|---|---|---|---|
| Load, Kg.: | | | | | | |
| 1 | 0.23 | 0.26 | 0.49 | 0.33 | 0.26 | 0.67 |
| 5 | | | | | 0.38 | 1.5 |
| 10 | 0.60 | 0.45 | 0.90 | 0.69 | 0.75 | 2.7 |
| 20 | 0.69 | 0.62 | | 0.83 | 0.86 | |

*Table IV*

EXTREME PRESSURE WEAR

[Scar diameter in mm.]

| Sample No. | Ex. 9 | Ex. 10, Cut 1 | Ex. 10, Cut 3 | Ex. 10, Cut 4 | Ex. 12 | 100 Neut. Min. Oil | Comm. "A" |
|---|---|---|---|---|---|---|---|
| Load, Kg.: | | | | | | | |
| 40 | | | | | | .36 | .65 |
| 60 | 0.90 | 0.40 | 0.90 | 0.85 | | 1.9 | 1.1 |
| 80 | 2.1 | | 1.4 | 1.4 | 0.5 | 1.6 | 1.8 |
| 100 | | 2.3 | | | 1.93 | 2.3 | 2.6 |
| 120 | | | | | | | |
| 140 | 2.8 | | | | | | |
| Seizure Load, Kg | [1] 70 | 85 | 70 | 70 | 85 | 50 | 60 |

[1] A load seizure value of 55 is considered a satisfactory value for the load carrying ability of a lubricant.

As will be apparent from the foregoing data, the compounds of the present invention, when used as lubricants, provide very satisfactory wear characteristics and, in general, equal to or better than neutral mineral oil or a known and available commercial "A" organo-siloxane lubricant.

While compounds of the present invention provide satisfactory lubrication under a wide variety of conditions and in a superior manner to many of the presently available commercial synthetic lubricants and mineral oils, it may be desirable under certain conditions to improve some of the properties by utilizing various known additives with these compounds. For example, it may be desirable to add such agents as antioxidants, color stabilizers, viscosity improvers, pour point depressants and the like.

It is to be understood that the foregoing description and representative samples set forth are provided primarily to illustrate the invention and are not to be taken in any way as limiting the invention. It is intended that the invention be limited only by the claims appended hereto.

We claim:

1. As a synthetic lubricant suitable for use under extreme conditions of temperature and pressure, the compound having the formula:

$$ROCACOR$$

(with two C=O groups above the carbons flanking A)

in which A represents the divalent group:

$$-(CH_2)_n Si\begin{bmatrix} R' \\ | \\ R' \end{bmatrix} \begin{bmatrix} R' \\ | \\ OSi \\ | \\ R' \end{bmatrix}_m (CH_2)_n$$

wherein R' represents an alkyl radical having from 1 to 8 carbon atoms, aryl, alkyl, aryl, aralkyl, or mixtures of these, $n$ has a value of from 2 to 7, $m$ has a value of from 1 to 6; R represents the monovalent group $$CH_xF_{3-x}(CH_yF_{2-y})_wCH_2-$$

wherein $x$ has a value of from 0 to 2, $y$ has a value of from 0 to 2, and $w$ has a value of from 0 to 10.

2. As a synthetic lubricant suitable for use under extreme conditions of temperature and pressure, the compound having the formula:

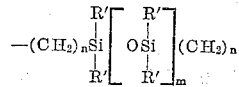

3. As a synthetic lubricant suitable for use under extreme conditions of temperature and pressure, the compound having the formula:

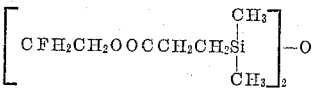

4. As a synthetic lubricant suitable for use under extreme conditions of temperature and pressure, the compound having the formula:

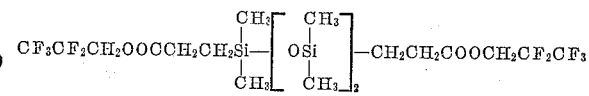

5. As a synthetic lubricant suitable for use under extreme conditions of temperature and pressure, the compound having the formula:

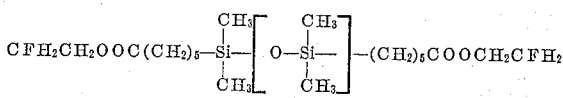

6. As a synthetic lubricant suitable for use under extreme conditions of temperature and pressure, the compound having the formula:

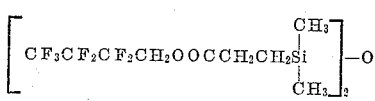

7. As a synthetic lubricant suitable for use under extreme conditions of temperature and pressure, the compound having the formula:

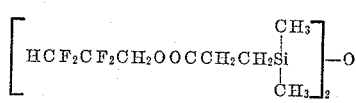

8. As a synthetic lubricant suitable for use under extreme conditions of temperature and pressure, the compound having the formula:

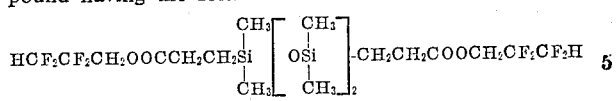

9. As a synthetic lubricant suitable for use under extreme conditions of temperature and pressure, the compound having the formula:

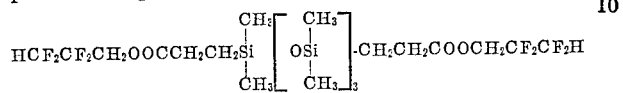

10. As a synthetic lubricant suitable for use under extreme conditions of temperature and pressure, the compound having the formula:

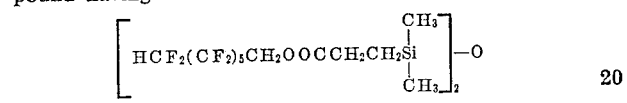

11. As a synthetic lubricant suitable for use under extreme conditions of temperature and pressure, the compound having the formula:

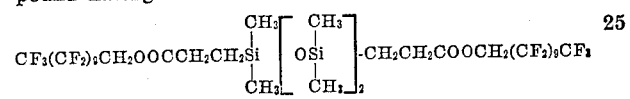

12. As a synthetic lubricant suitable for use under extreme conditions of temperature and pressure, the compound having the formula:

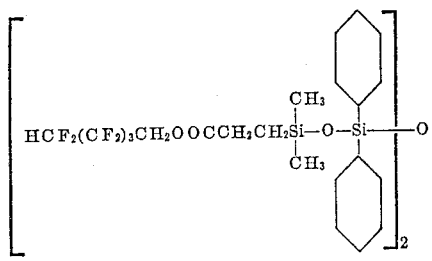

References Cited in the file of this patent

UNITED STATES PATENTS

| | | |
|---|---|---|
| 2,691,032 | Sommer | Oct. 5, 1954 |
| 2,710,877 | Young et al. | June 14, 1955 |
| 2,907,783 | Kerschner et al. | Oct. 6, 1959 |

OTHER REFERENCES

Lincoln et al.: Ind. Eng. Chem., vol. 28, No. 10, October 1936, pages 1191–97.

UNITED STATES PATENT OFFICE
CERTIFICATION OF CORRECTION

Patent No. 3,014,056            December 19, 1961

Paul M. Kerschner et al.

It is hereby certified that error appears in the above numbered patent requiring correction and that the said Letters Patent should read as corrected below.

Column 8, line 48, for "single" read -- simple --; column 10, lines 55 to 59, after the closing bracket insert a subscript "6"; column 11, lines 25 to 27, after the closing bracket, for the subscript "2" read -- 4 --.

Signed and sealed this 8th day of May 1962.

(SEAL)
Attest:

ERNEST . SWIDER                         DAVID L. LADD
Attesting Officer                       Commissioner of Patents